RE 25148

Nov. 1, 1960 H. D. CRANE ET AL 2,958,854

MULTI-APERTURE CORE ELEMENT DESIGN FOR MAGNETIC CIRCUITS

Filed March 3, 1958 2 Sheets-Sheet 1

HEWITT D. CRANE
DAVID R. BENNION
FRED C. HEINZMANN
INVENTORS

BY Christie, Parker & Hale
ATTORNEYS

Nov. 1, 1960

H. D. CRANE ET AL 2,958,854

MULTI-APERTURE CORE ELEMENT DESIGN
FOR MAGNETIC CIRCUITS

Filed March 3, 1958

2 Sheets-Sheet 2

HEWITT D. CRANE
DAVID R. BENNION
FRED C. HEINZMANN
INVENTORS

BY Christie, Parker & Hale
ATTORNEYS

United States Patent Office 2,958,854
Patented Nov. 1, 1960

2,958,854

MULTI-APERTURE CORE ELEMENT DESIGN FOR MAGNETIC CIRCUITS

Hewitt D. Crane, Palo Alto, David R. Bennion, Loma Mar, and Fred C. Heinzmann, Palo Alto, Calif., assignors to Burroughs Corporation, Detroit, Mich., a corporation of Michigan Filed Mar. 3, 1958, Ser. No. 718,883

2 Claims. (Cl. 340—174)

This invention relates to digital magnetic core circuits, and more particularly, is concerned with the design of multi-aperture core elements for use in such circuits.

In copending application Serial No. 698,633, filed November 25, 1957 in the name of Hewitt D. Crane, and now abandoned, and assigned to the assignee of the present invention, there is described a core register having a novel transfer circuit requiring no diodes or other impedance elements in the transfer loops between the magnetic core devices in the register. The present invention is directed to an improved design for the magnetic core devices useful in the core register circuit therein described.

The binary storage devices of the core register circuit are annular cores having input and output apertures therein, each of the apertures dividing the respective core into two parallel flux paths. The binary zero digits are stored in the form of flux oriented in the same direction in the flux paths on either side of the respective apertures, while the binary one digits are stored in the form of flux extending in opposite directions in the flux paths on either side of the respective apertures. Transfer is effected by applying a current pulse of predetermined magnitude to a coupling loop linking one aperture in each of adjacent cores, one core constituting a transmitting core and the other core constituting a receiving core in relation to each coupling loop in the register circuit.

By the present invention, it has been found that the quality of operation of circuits utilizing the transfer concept described above in said copending application can be greatly improved by altering and refining the shape of the core elements used over the simple annular shaped cores heretofore employed. In particular, it has been found that discrimination, i.e., the ratio of the amount of flux switched in the receiving core by the transfer pulse in transferring a binary one from the transmitting core to the flux switched in the receiving core in transferring a binary zero from the transmitting core, is increased. Likewise the range over which the magnitude of the drive current applied to the transfer loop between the transmitting and receiving core may be varied without materially affecting the operation of the register is improved. This may be accomplished to a "first-order" correction by shaping the core in a manner to insure that all the core material is saturated when the core element is in its cleared state, i.e., when a field is applied to the core element to cause all of the flux to be oriented in one direction.

In brief, the invention provides for an annular core piece of substantially uniform radial cross-sectional area and having at least two small apertures in the annular core piece. The annular core piece is enlarged at the position of the apertures by an amount to maintain the radial cross-sectional area at the point of the apertures the same as the balance of the core piece.

For a more complete understanding of the invention, reference should be had to the accompanying drawings, wherein:

Figs. 1, 2, and 3 show a conventional multi-aperture magnetic core element in various conditions of magnetization;

Figure 1:
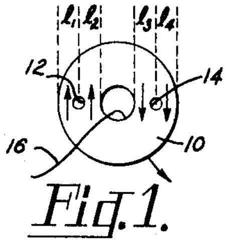
Figure 2:
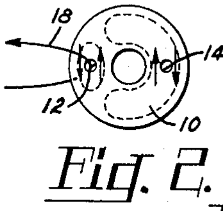
Figure 3:
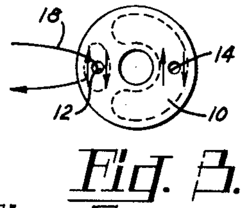

As described in more detail in the above-mentioned copending application, a binary register and transfer circuit can be constructed using basic core elements as shown in Figs. 1, 2 and 3. The core elements comprise an annular core 10 made of magnetic material, such as ferrite, having a "square" hysteresis loop, i.e., a material having a high flux remanence. The annular core 10 is provided with two apertures 12 and 14 which each divide the core into two legs or parallel flux paths, as indicated at $l_1$, $l_2$, $l_3$, and $l_4$. If a large current is passed through the central opening of the core 10, as by a clearing winding 16, the flux in the core may be saturated in a clockwise direction, as indicated by the arrows in Fig. 1. This flux condition of the core is designated as the binary zero condition. If a current is passed through one of the apertures 12 or 14, as by passing a current through a winding 18 passing through the aperture 12, the flux in the legs $l_1$ and $l_3$ is reversed, as indicated by the arrows in Fig. 2. This flux condition is designated as the binary one condition.

If the current is now passed through the winding 18 in the opposite direction, the flux is switched locally in the legs $l_1$ and $l_2$ around the aperture 12, but no flux is switched in the legs $l_3$ and $l_4$ about the aperture 14, as shown by the arrows in Fig. 3.

Figure 4:
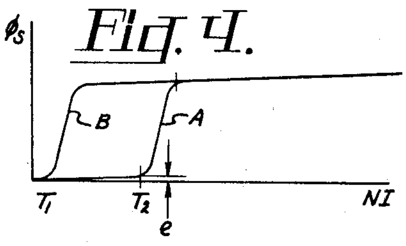
Fig. 4 is a set of curves illustrating the desired magnetizing properties of the core element of Figs. 1, 2, and 3 in response to current passing through one of the small apertures in the core element.

If the core 10 is initially in its cleared or binary zero condition, applying a current through the winding 18 linking the aperture 12 of the core 10 switches flux according to the relation set forth by curve A in Fig. 4, which is a plot of switched flux $\Phi_s$ as a function of ampere-turns NI. Thus if the ampere-turns is increased up to threshold level $T_2$, substantially no flux is switched in the core. When the ampere-turns exceeds this threshold level, the flux rapidly begins to switch with further increase of ampere-turns, until a saturation level is reached in which all of the flux is switched in the opposite direction that can be switched. As mentioned above, this results in the flux pattern of Fig. 2 in which the core is in its set or binary one condition.

If the current is passed through the winding 18 in the opposite direction with the core in its binary one condition, the resulting switched flux as a function of ampere-turns is represented by curve B of Fig. 4. It will be seen that in this case the threshold level $T_1$ is substantially less than the threshold lever $T_2$ of curve A. If the ampere turns NI is increased beyond the threshold $T_1$, flux begins switching and as NI increases, further flux continues switching until a saturation level is reached in which all the flux is switched that can be switched.

Figure 5:
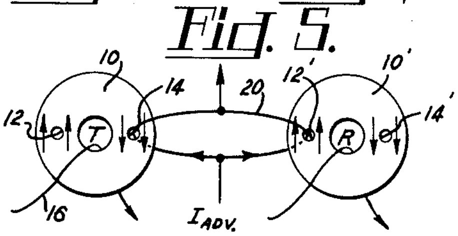
Figs. 5 and 6 show pairs of core elements linked by a transfer circuit.

As further described in the above-identified copending application, the flux state of one core can be transferred to another core in the following manner. Consider the circuit of Fig. 5 including a transmitter core 10 and a receiver core 10'. A coupling loop 20 links the core 10 through the aperture 14 to the core 10' through the aperture 12'. An advance current $I_{Adv}$ splits between the winding linking the aperture 14 of the transmitting core and the aperture 12' of the receiving core. The level of the advance current and the resistance of the conductors in the respective windings are arranged so that, with the cores in their cleared condition as shown in Fig. 5, they are both brought up to the threshold level $T_2$, as indicated in Fig. 4. Thus no flux is switched in either core.

Figure 6:
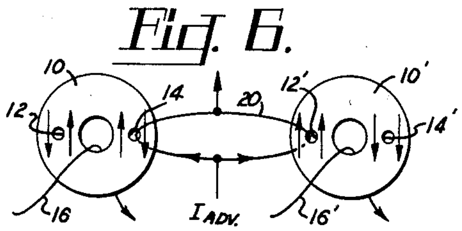

However, if the transmitting core 10 has been previously set with its flux in the binary one condition, as shown in Fig. 6, a current passing through the aperture 14 can switch flux locally in the core 10 because the transfer current exceeds the lower threshold level $T_1$. The switching of flux about the aperture 14 in the transmitting core 10 induces a voltage in the coupling loop which, by Lenz's law, opposes the flow of current in the branch of the coupling loop linking the aperture 14 through the transmitting core. As a result the current passing through the branch of the transfer loop 20 which links the aperture 12' of the receiving core 10' increases. The increased current is sufficient to switch flux in the receiving core 10', thereby setting the flux to the binary one condition.

In this manner the application of a transfer pulse of predetermined magnitude across the transfer loop 20 leaves the receiving core 10' in the binary zero state or changes it to a binary one state, depending on the existing condition of the transmitting core 10.

From the above analysis of the transfer circuit, it will be appreciated that the primary properties required of the multi-apertured core element are first that the flux-switching characteristic as shown in Fig. 4 should be "square." This is to say that (*a*) the value $\epsilon$ of switched flux at the threshold $T_2$ must be very near zero in order that little flux be transferred to the receiving element from a transmitting element in the zero state, (*b*) the flux must substantially all switch with a minimum increase in ampere-turns above the $T_2$ level in order to obtain higher-speed switching and wide current range, and (*c*) the curve should be flat above the upper "knee" at K in order that the element may be saturated sharply during setting.

How square the characteristic of Fig. 4 is depends strongly upon both the material used and the geometry of the element. For this reason, materials having a square hysteresis loop characteristic are used, such as ferrite, for the core elements. The present invention is directed to the shaping of the core elements to improve the squareness of the flux switching characteristic of Fig. 4.

Figure 7:
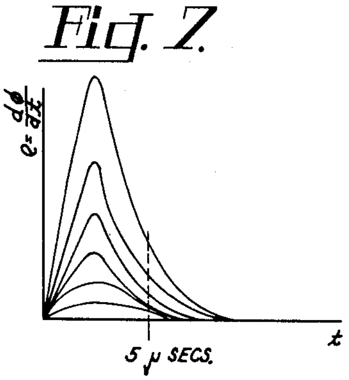
Figs. 7 and 8 show two possible switching voltage wave forms for the receiving core element in the circuits of Figs. 5 and 6.
Figure 8:
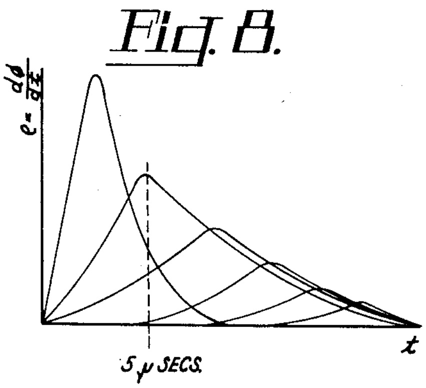

A second property desired in a core element for use in the transfer circuit above described may be appreciated by considering the curves of Figs. 7 and 8. For high speed operation of the transfer circuit it is desirable that fast switching at high flux levels, occurring in the transfer of binary ones from transmitting to receiving core elements, be effected. The higher the switching speed, the shorter the required duration of the current pulses applied to the transfer loop for effective transfer between the core elements. It is even more important to have fast switching at high levels relative to switching speed at low flux levels, as occurs with the transfer of zeros. The reason of course is that it is desirable to produce little or no switching of flux in the receiving core element with the transfer of binary zeros.

The curves of Figs. 7 and 8 show two possible sets of switching voltage waveforms as a function of time, resulting from the application of a transfer current to the coupling loop linking the transmitting and receiving core elements. The family of waveforms corresponds to the various levels of set flux in the transmitting core element. It will be apparent from the curves of Fig. 7, that in this case a pulse length of 5 microseconds, for example, while switching most of the flux at high set flux levels, also switches most of it at low set flux levels. In contrast, the group of curves of Fig. 8 provide a condition where a 5 microsecond pulse switches almost all the flux at high set flux levels, but switches only a small fraction of the available flux at low set flux levels. This condition illustrated by the curves of Fig. 8 is therefore more desirable because the comparatively low speed of switching for the zero flux state insures that relatively little flux will be switched in the receiving core during the transfer of binary zeros by a pulse of short duration.

It is known that a toroidal core can be more completely magnetized in one direction than any less symmetrical shape. In principle, all domain walls may be swept out of a toroidal core by a sufficiently large clearing pulse, and the internal magnetic field will be zero after the pulse is removed. However, any destruction of the symmetry, such as the constriction in the cross-sectional area of the core material imposed by the input and output apertures extending through the core results in residual internal fields and some demagnetization (reversed domains) after the clearing current is removed. Partial demagnetization results in poorly defined thresholds in the switching flux characteristic, as shown in the curves of Fig. 4. On the other hand, with complete saturation in which all the material is operating on its major hysteresis loop, sharper higher thresholds are possible. Thus full saturation of all material in the core element is essential in obtaining the desired squareness of the flux switching characteristic of Fig. 4.

Furthermore, it has been found that an unsymmetrical core, or one with constrictions due to the input and output apertures, produces the undesirable switching voltage waveforms of Fig. 7. This is probably due to the remanent reverse domains which are relatively rapidly switched at any flux level. Elements with more equalized cross-sectional areas have slower switching rates at low flux levels, thus approximating more closely the desired curves of Fig. 8.

Figure 9:
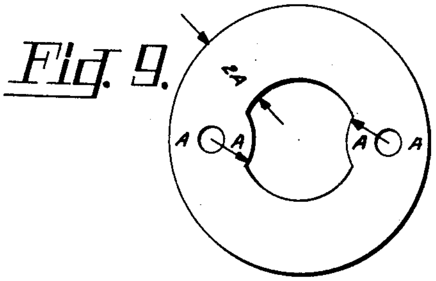
Figs. 9–14 show various ways of shaping multiple-aperture core elements according to the present invention to achieve the improved results described.
Figure 10:
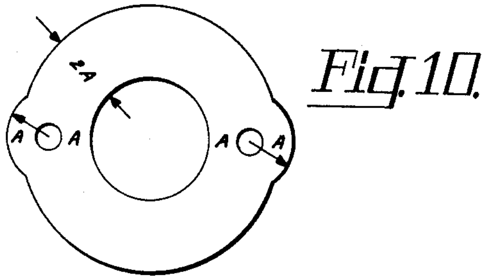
Figure 11:
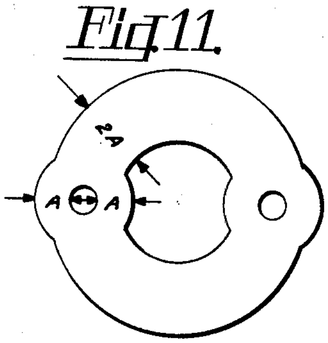

As a first approximation, complete saturation implies essentially uniform material cross-section perpendicular to the flux lines in the core. In Figs. 9, 10, and 11, core shapes are shown in which the radial thickness of the core is increased in the region of the apertures. The increase may be either on the inner diameter as in Fig. 9 and the outer diameter as in Fig. 10, or in both, as in Fig. 11. In any event, the radial dimensions are altered in such a way that the cross-sectional area of the core material itself is the same in the region of the aperture as it is in the balance of the core.

Figure 12:
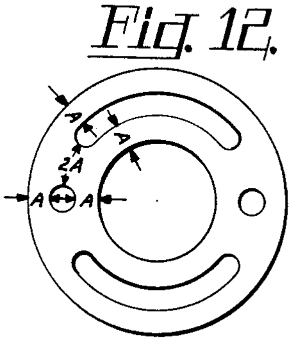

The same effect can be achieved in the manner shown in Fig. 12 by providing arcuate slots in the core in the region between the apertures so as to reduce the cross-sectional area in the region between the apertures to a value substantially equal to the cross-sectional area of core material at the apertures.

Figure 13:
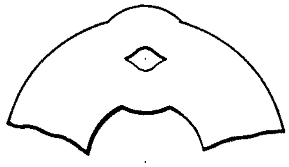

The ultimate in maintaining equal cross-sectional areas in all regions of the core is shown in Fig. 13 in which the apertures themselves are elongated rather than round for further reducing the unsaturated zones around the aperture.

Figure 14:
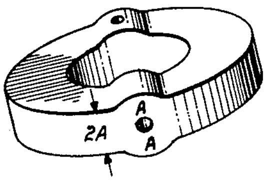

As shown in Fig. 14, the core material may be increased in the region of the apertures by increasing the thickness in a direction parallel to the axis of revolution of the core, rather than radially as in the forms of the invention described above. Fig. 14 illustrates the fact that the input and output apertures may extend either radially through the core or in a direction parallel to the axis of revolution.

It has been found that all of the above illustrated shapes provide substantial improvement in the desired properties of the core element, particularly in achieving the switching voltage waveforms of Fig. 8. There is little to choose between the various shapes shown from a performance standpoint, but some are more desirable from the standpoint of fabrication than others.

While core elements with only two apertures have been illustrated and described, it will be appreciated that the same principles of core shaping can be applied where greater numbers of apertures are required in the core elements of the register. In any event shaping the core elements as taught greatly improves the reliability of operation of the register circuit employing the core elements.

What is claimed is:

1. A magnetic core device comprising a body of sintered ferrite material having a substantially rectangular hysteresis loop characteristic, the body having a large circular aperture and at least two small circular apertures, the outer circumference of the body being circular over a substantial portion of its length with the center of radius at the center of the large aperture, the body further having arcuate projections adjacent each of the small apertures with the center of radius of each of the arcuate projections being at the center of the adjacent small aperture, each of the projections extending radially beyond the outer circumference of the body by an amount equal to the diameter of the adjacent small aperture.

2. A magnetic core device comprising a body of material having a substantially rectangular hysteresis loop characteristic, the body having a large circular aperture and at least two small circular apertures, the outer circumference of the body being circular over a substantial portion of its length with the center of radius at the center of the large aperture, the body further having regions of increased cross-sectional area adjacent each of the small apertures, said regions including the apertures, each of the regions being increased in one cross-sectional dimension by an amount equal to the diameter of the adjacent small aperture.

References Cited in the file of this patent

UNITED STATES PATENTS

| | | |
|---|---|---|
| 2,284,406 | D'Entremont | May 26, 1942 |
| 2,745,908 | Cohen et al. | May 15, 1956 |
| 2,863,136 | Abbott et al. | Dec. 2, 1958 |
| 2,869,112 | Hunter | Jan. 13, 1959 |
| 2,921,281 | Cushman | Jan. 12, 1960 |

OTHER REFERENCES

"The Transfluxor," by J. A. Rajchman and A. W. Lo, Proceedings of IRE, March 1956, pp. 321 to 332.

"Multihole Ferrite Core Configuration and Application," by H. W. Abbott and J. J. Suran. Proceedings of IRE, August 1957, pp. 1081 to 1093.